United States Patent
Marriott et al.

(10) Patent No.: US 7,523,723 B2
(45) Date of Patent: Apr. 28, 2009

(54) SYSTEM AND METHOD FOR DETERMINING ETHANOL CONTENT IN FUEL

(75) Inventors: Craig D. Marriott, Clawson, MI (US); Matthew A. Wiles, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 281 days.

(21) Appl. No.: 11/626,545

(22) Filed: Jan. 24, 2007

(65) Prior Publication Data

US 2008/0035119 A1    Feb. 14, 2008

Related U.S. Application Data

(60) Provisional application No. 60/837,033, filed on Aug. 11, 2006.

(51) Int. Cl.
*F02B 43/00* (2006.01)
*F02M 51/00* (2006.01)
*G01M 19/00* (2006.01)

(52) U.S. Cl. ............... 123/1 A; 73/114.38; 73/114.39; 73/114.43; 73/114.48; 73/114.51; 701/104

(58) Field of Classification Search ............... 123/1 A, 123/494, 406.43, 457, 575, 576, 685, 674; 701/103, 104, 105, 47, 50, 137, 138; 73/114.38, 73/114.52, 114.39, 114.41, 114.42, 114.43, 73/114.45, 114.48, 114.51, 23.31, 23.32, 73/19.05, 19.1
See application file for complete search history.

(56) References Cited

U.S. PATENT DOCUMENTS

| | | | |
|---|---|---|---|
| 6,257,174 B1 * | 7/2001 | Huff et al. | ............ 123/1 A |
| 6,975,933 B2 * | 12/2005 | Abe et al. | ............ 701/109 |
| 2004/0154386 A1 * | 8/2004 | Shinzawa | ............ 73/118.1 |
| 2004/0237951 A1 * | 12/2004 | Abe | ............ 123/674 |

* cited by examiner

*Primary Examiner*—Michael Cuff
*Assistant Examiner*—Hung Q Nguyen

(57) ABSTRACT

A system and method are provided for determining an ethanol content of a fuel that is part of a fuel and air mixture combusted within an internal combustion engine. A pressure characteristic of a fuel rail is monitored during operation of the engine. At least one of an effective bulk modulus of the fuel and a pressure perturbation signature is determined based on the pressure characteristic. The ethanol content is determined based on the at least one of the effective bulk modulus and the pressure perturbation signature.

21 Claims, 4 Drawing Sheets

SYSTEM AND METHOD FOR DETERMINING ETHANOL CONTENT IN FUEL

CROSS-REFERENCE TO RELATED APPLICATIONS

This application claims the benefit of U.S. Provisional Application No. 60/837,033, filed on Aug. 11, 2006. The disclosure of the above application is incorporated herein by reference.

FIELD

The present disclosure relates to engine systems, and more particularly to a system and method for determining an ethanol content of fuel.

BACKGROUND

The statements in this section merely provide background information related to the present disclosure and may not constitute prior art.

An internal combustion engine generates drive torque by combusting an air and fuel mixture within cylinders. More specifically, air is drawn into the engine and is distributed to the cylinders. The air is mixed with fuel to form a combustion mixture having a desired air to fuel ratio, which is combusted within a cylinder. The combustion process reciprocally drives a piston within the cylinder, which rotatably drives a crankshaft to provide the drive torque.

More recently, alternative fuels, such as alcohol-based fuels, have been developed for use with engine systems. Alcohol-based fuels include methanol and ethanol, for example. Modern engine systems are able to operate using gasoline, alcohol-based fuel or any mixture thereof. However, engine operation must be modified when operating on different fuels because of the different characteristics of each fuel. For example, an engine operating using ethanol or an ethanol and gasoline blend, for example E85 (i.e., a blend of 85% ethanol and 15% gasoline) requires an increased amount of ethanol relative to gasoline at stoichiometry due to different chemical compositions.

Some engine systems include a direct measurement of the ethanol content using a fuel sensor. The implementation of such a fuel sensor increases overall cost and complexity of the engine system.

Other engine systems include an indirect measure of ethanol content. More specifically, an air to fuel ratio calculation is used to determine the ethanol/gasoline fuel content. This is achieved by comparing the mass air flow (MAF) with the predetermined injected fuel quantity at a stoichiometric exhaust condition to provide the air to fuel ratio. The air to fuel ratio is used to determine the fuel content with good accuracy knowing that a stoichiometric air to fuel ratio for ethanol is near 9:1, while gasoline requires an air to fuel ratio near 14.5:1.

While the current state-of-the-art virtual sensor can provide an accurate measurement of fuel content, it is slow and prone to false readings due to the effects of several unrelated engine operating conditions.

SUMMARY

Accordingly, the present disclosure provides a system and method of determining an ethanol content of a fuel that is part of a fuel and air mixture combusted within an internal combustion engine. A pressure characteristic of a fuel rail is monitored during operation of the engine. At least one of an effective bulk modulus of the fuel and a pressure perturbation signature is determined based on the pressure characteristic. The ethanol content is determined based on the at least one of the effective bulk modulus and the pressure perturbation signature.

In another feature, the pressure characteristic includes at least one of a group consisting of a pressure decrease resulting from an injection event and a pressure increase resulting from a pump event.

In another feature, the pressure perturbation signature includes averages corresponding to a pressure amplitude over a plurality of injection/pump events.

In another feature, the ethanol content is calculated based on the pressure characteristic.

In still another feature, the ethanol content is determined from a look-up table based on the pressure perturbation signature.

In yet other features, the ethanol content is further determined based on at least one of a volume of a fuel rail, a volume of injected fuel, a volume of pumped fuel, a bulk modulus of gasoline and a bulk modulus of ethanol. The volume of a fuel rail, the bulk modulus of gasoline and the bulk modulus of ethanol are provided as pre-stored constants.

The present disclosure provides an improved virtual fuel content sensor that improves the current sensing method by providing a fast-response fuel system specific measurement for additional logical reduction (i.e., less computational requirements) and improved robustness.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
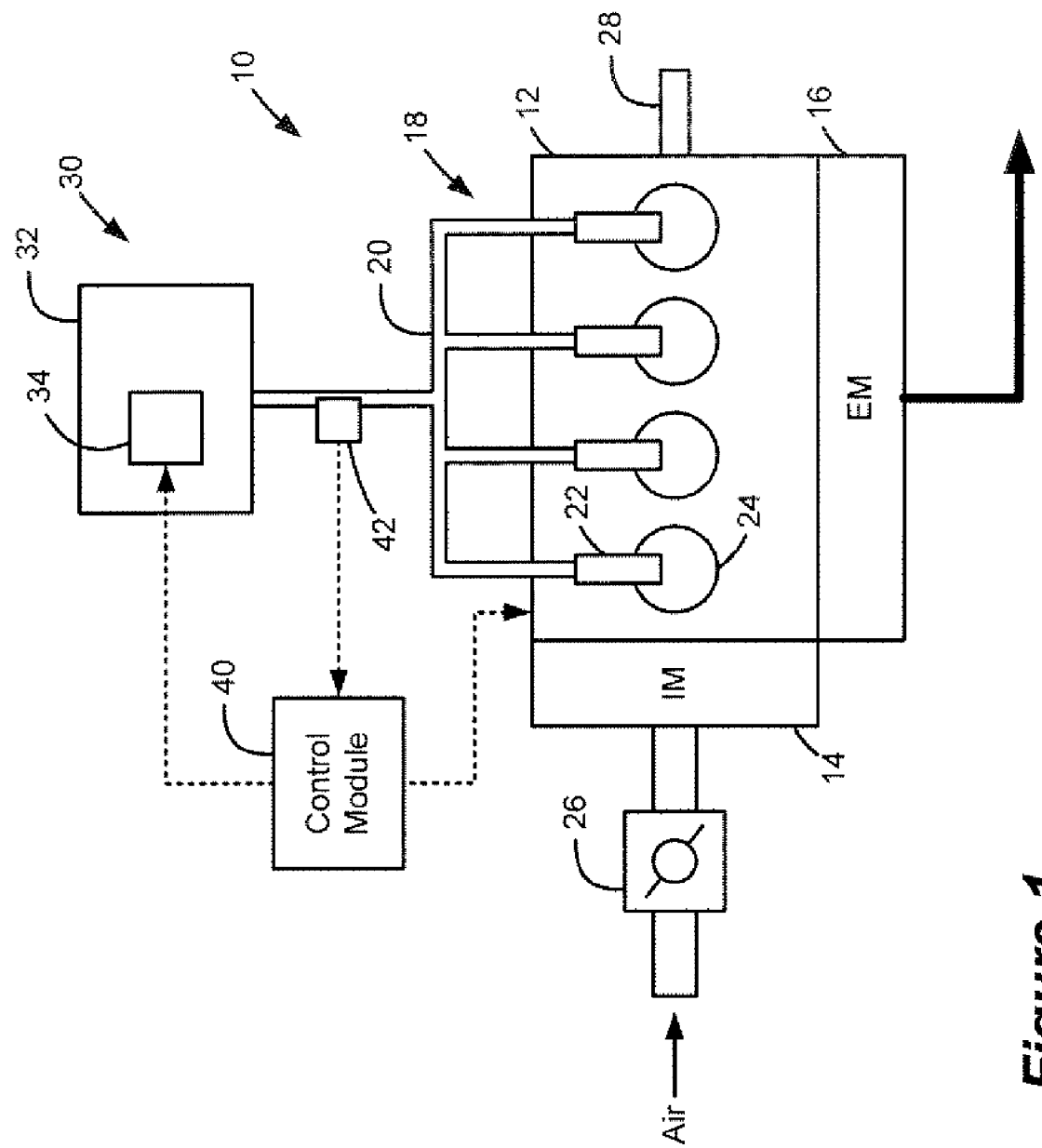
FIG. 1 is a functional block diagram of an exemplary engine system.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary engine system 10 is illustrated. The exemplary engine system 10 includes an engine 12 having an intake manifold 14 and an exhaust manifold 16. The engine system 10 further includes a fuel injection system 18 having a fuel rail 20 and a plurality of fuel injectors 22 associated with respective cylinders 24. Air is drawn into the intake manifold 14 through a throttle 26 and is distributed to the cylinders 24. The air is mixed with fuel, which is injected using a respective fuel injector 22, to form a combustion mixture within a cylinder 24. The combustion mixture is provided at a desired air to fuel ratio and is combusted within the cylinder to reciprocally drive a piston (not shown), which in turn drives a crankshaft 28. Exhaust gas is exhausted from the engine 12 through the exhaust manifold 16.

A fuel system 30 provides fuel to the injection system 18. More specifically, the fuel system 30 includes a fuel reservoir 32 and a fuel pump 34. The fuel pump 34 can be a fixed displacement pump or a variable displacement pump and provides pressurized fuel to the fuel rail 20. As the fuel injectors 22 inject fuel into the respective cylinders 24, the fuel pump 34 replenishes the pressurized fuel within the fuel rail 20.

A control module 40 regulates operation of the engine system 10 based on the ethanol content determining control of the present disclosure. More specifically, a pressure sensor 42 monitors a fuel pressure within the fuel rail 20. The control module 40 determines the ethanol content of the fuel based on a pressure characteristic, as described in further detail below. Having determined the ethanol content, the control module 40 can appropriately regulate the air to fuel ratio and other combustion control parameters based on the ethanol content.

Figure 2:
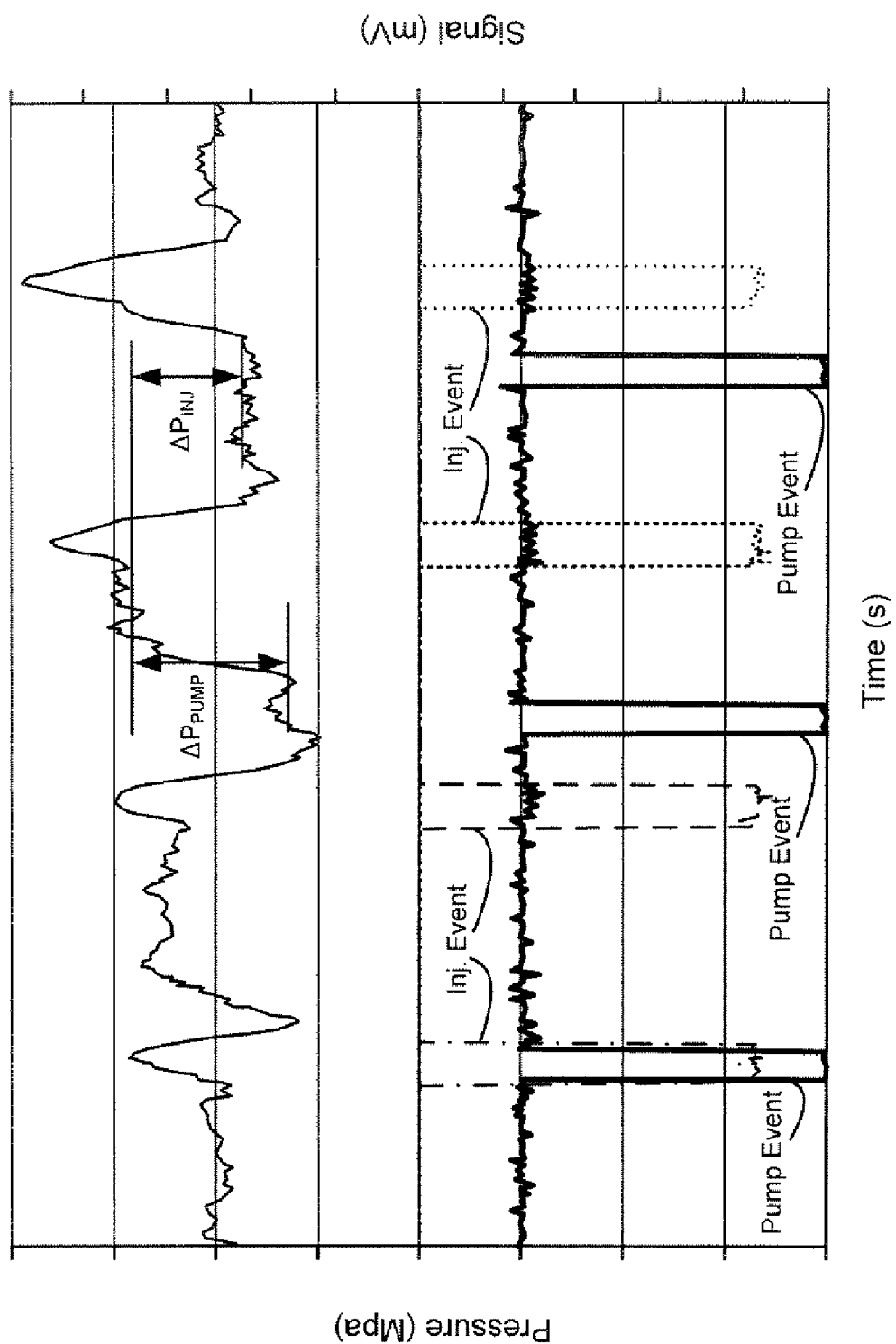
FIG. 2 is a graph illustrating exemplary operating parameter traces used in accordance with the ethanol content determining control of the present disclosure.

The present disclosure determines the content of ethanol in fuel using predetermined direct injection fuel system content. This content includes the volume of the fuel rail, which is known, and the fuel rail pressure sensor, which is provide as a fast-response sensor. This content can be used to determine the ethanol content in the fuel based on a pressure characteristic. FIG. 2 provides a graph illustrating exemplary operating parameter traces including fuel rail pressure and injection events.

It is preferable that the ethanol content is determined while the engine and/or fuel rail pressure is at steady-state. More specifically, steady-state is an engine operating mode, during which the average fuel pressure is nearly constant. However, the engine and/or fuel rail pressure does not need to be at steady-state if an event based algorithm is used, wherein the effective bulk modulus is calculated for any particular pump or injection event. It may be, however, more practical to consider longer term or more simplified characteristics of the pressure signature (i.e., peak-to-peak). In such a simplified implementation, the correlation to ethanol content would be mapped to dimensions of only steady-state reference.

In one feature, the ethanol content determining control determines the ethanol content based on injection events. More specifically, a predetermined volume of fuel is injected directly into the cylinder from the fuel rail having a known volume. As a result of the injection event, hydraulic energy is a depleted from the fuel rail, where the energy is stored as an accumulator. This energy is depleted from the fuel rail in the form of pressure and injected volume, resulting in a lower fuel rail pressure after the injection event.

The reduction of pressure in the fuel rail is related to the bulk modulus of the fluid (i.e., the fluid elasticity) and the predetermined fuel rail volume (i.e., the storage capacity). Because the bulk modulus of ethanol is significantly less than gasoline, the resulting pressure reduction in the fuel rail will be less than that with gasoline alone. The fuel pressure sensor can be used to measure the pressure characteristic as a pressure decrease in the fuel rail resulting from an injection event.

The ethanol content is determined based on injection events using the following relationships:

$$BM_{EFFINJ} = \frac{\Delta P_{INJ}}{V_{INJ}} \cdot V_{RAIL} \quad (1)$$

$$E_{RATIO} = 100 \cdot \frac{(BM_{EFFINJ} - BM_{GAS})}{(BM_{ETH} - BM_{GAS})} \% \quad (2)$$

where: $V_{RAIL}$ is the known volume of the fuel rail;
$\Delta P_{INJ}$ is the pressure decrease as a result of the injection event;
$V_{INJ}$ is the volume of injected fuel;
$BM_{EFFINJ}$ is the effective bulk modulus for the injection event;
$BM_{GAS}$ is the known bulk modulus of gasoline;
$BM_{ETH}$ is the known bulk modulus of ethanol; and
$E_{RATIO}$ is the ethanol ratio provided as a percentage.

$V_{INJ}$ can be calculated by the control module as an open-loop control term for the fuel injectors, or for steady-state conditions, in accordance with the following relationship:

$$V_{INJ} = \frac{3}{4} \cdot V_{PUMP} \quad (3)$$

where: $V_{PUMP}$ is the known pump displacement for an injection event; and
¾ is an exemplary conversion indicated 4 injection events for 3 pump events.

The ¾ term can vary from engine system to engine system depending on the engine configuration and the fuel pump configuration. $V_{PUMP}$ can be provided as a fixed volume, such as is the case when the fuel pump is a fixed displacement pump, or can be calculated by the control module as an open-loop control term, which is provided ahead of the injection event, such as is the case when the pump is a variable displacement pump.

In another feature, the ethanol content is determined based on pump events. More specifically, each pump event compresses a predetermined quantity of fuel into the fuel rail, resulting in a pressure increase, which is again proportional to the bulk modulus of the fuel and know fuel rail volume. The ethanol content us determined based on pump events using the following relationships:

$$BM_{EFFPUMP} = \frac{\Delta P_{PUMP}}{V_{PUMP}} \cdot V_{RAIL} \quad (4)$$

$$E_{RATIO} = 100 \cdot \frac{(BM_{EFFPUMP} - BM_{GAS})}{(BM_{ETH} - BM_{GAS})} \% \quad (5)$$

where: $\Delta P_{PUMP}$ is the pressure increase as a result of the pump event; and
$BM_{EFFPUMP}$ is the effective bulk modulus for the pump event.

In another feature, a plurality of injection events and pumping events often overlap in time, creating a pressure perturbation signature. The amplitude of the perturbation signature is again proportional to the bulk modulus of the fuel. The bulk modulus of the fuel, and thus the effective bulk modulus of the ethanol/gasoline content can be assessed within this signature by measuring the pressure perturbation amplitude. This measurement can then be compared to a predetermined, pre-stored look-up table in the control module with the expected amplitudes as a function of injected volume and/or engine speed to determine the ethanol content of the fuel. For example, average minimum and maximum amplitude for a plurality of combustion events can be determined and compared to look-up table values to provide the ethanol content.

Figure 3:
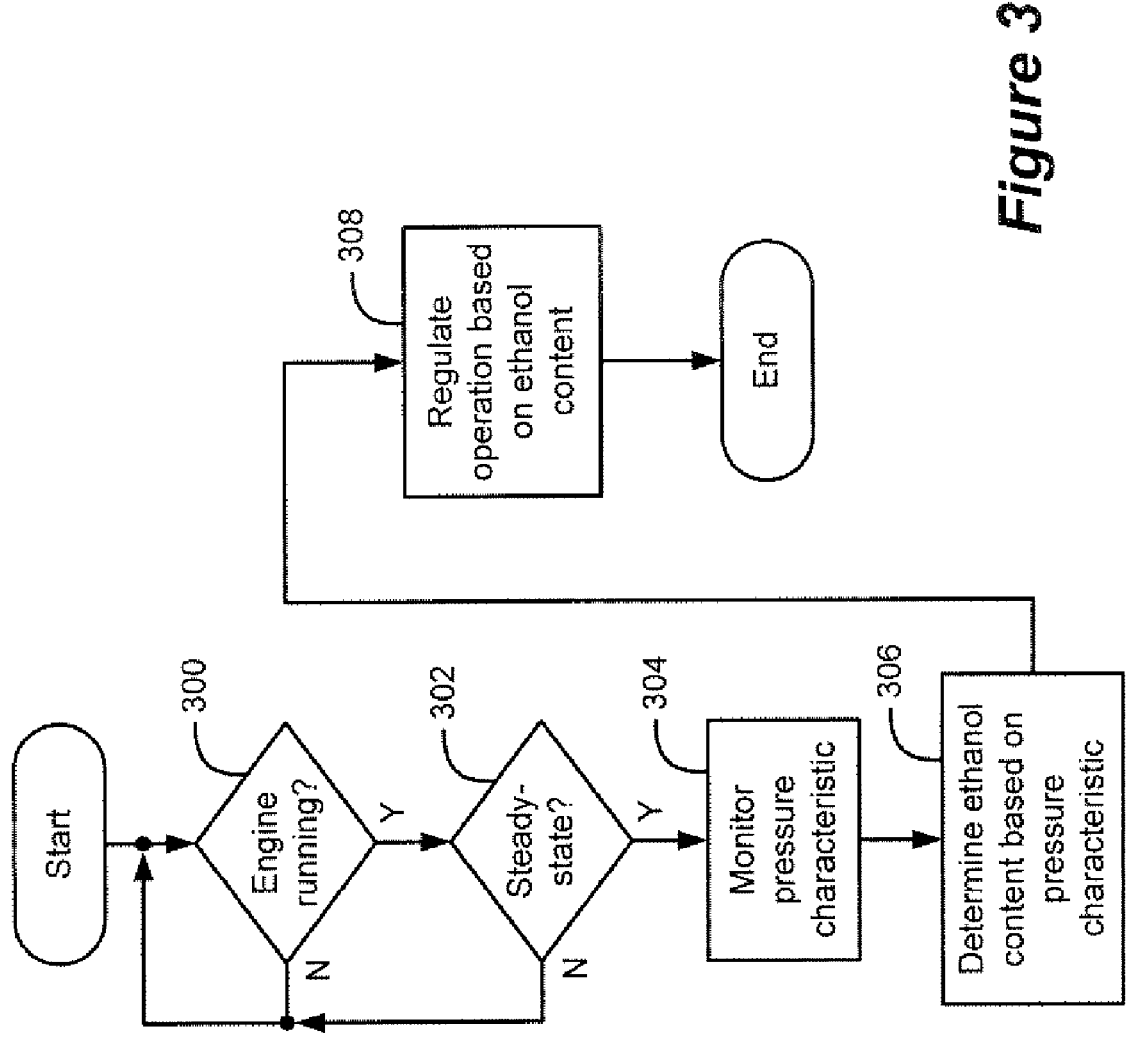
FIG. 3 is a flowchart illustrating exemplary steps executed by the ethanol content determining control of the present disclosure.

Referring now to FIG. 3, exemplary steps executed by the ethanol content determining control will be described in detail. In step 300, control determines whether the engine is running. If the engine is not running, control loops back. If the engine is running, control determines whether the engine is operating in steady-state in step 302. If the engine is not operating in steady-state, control loops back to step 300. If the engine is operating in steady-state, control continues in step 304.

In step 304, control monitors a pressure characteristic of the fuel system. The pressure characteristic can include a pressure decrease resulting from an injection event, a pressure increase resulting from a pump event and/or a pressure perturbation signature including, but not limited to, minimum and maximum amplitude values. Control determines the ethanol content of the fuel based on the pressure characteristic in step 306. More specifically, the ethanol content can be determined as a direct calculation based on the pressure increase or decrease and/or based on the pressure perturbation signature using a look-up table. In step 308, control regulates operation of the engine based on the ethanol content. For example, control adjusts the air to fuel ratio, spark advance, and valve timing calculations based on the ethanol content.

Figure 4:
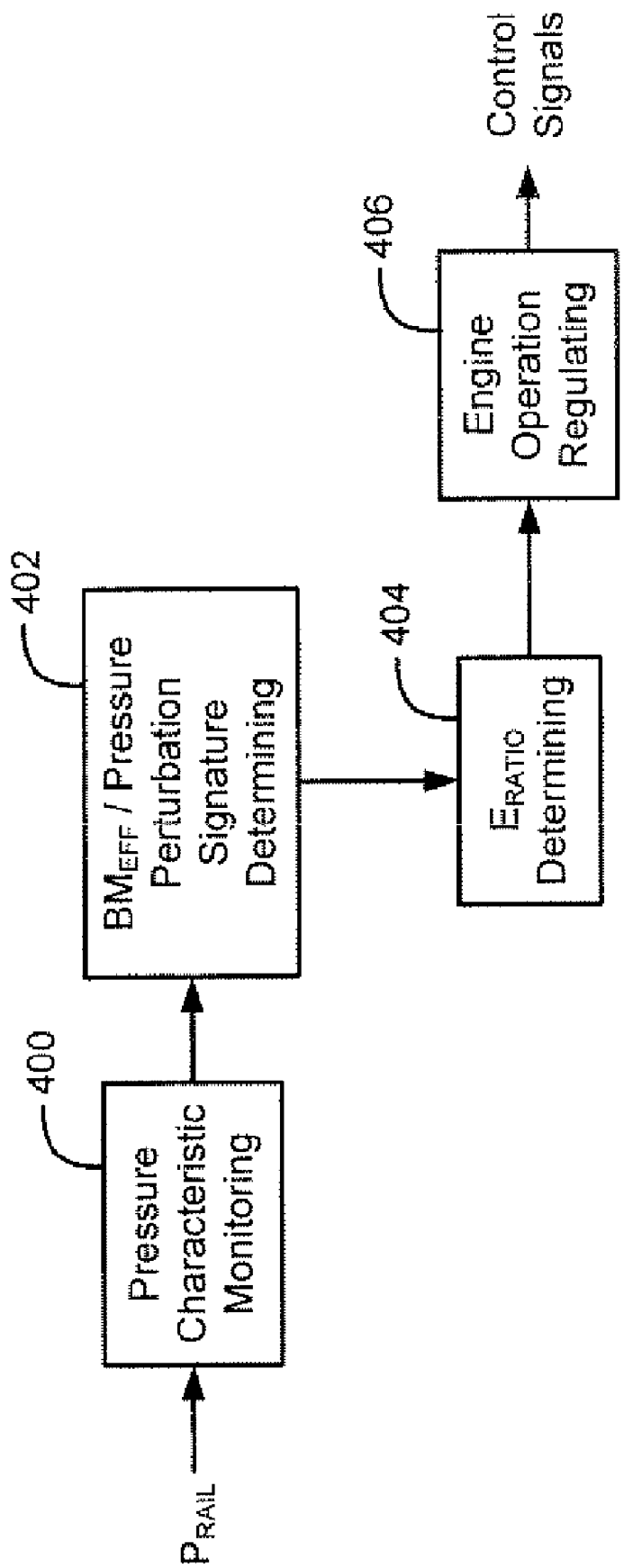
FIG. 4 is a functional block diagram of exemplary modules that execute the ethanol content determining control of the present disclosure.

Referring now to FIG. 4, exemplary modules that execute the ethanol content determining control will be described in detail. The exemplary modules include a first module 400 that monitors a pressure characteristic of the fuel rail during operation of the engine and a second module 402 that determines at least one of an effective bulk modulus of the fuel and a pressure perturbation signature based on the pressure characteristic. A third module 404 determines the ethanol content of the fuel based on said at least one of said effective bulk modulus and said pressure perturbation signature, as described in detail above. A fourth module 406 regulates operation of the engine based on the ethanol content.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of determining an ethanol content of a fuel that is part of a fuel and air mixture combusted within an internal combustion engine, comprising:
    monitoring a pressure characteristic of a fuel rail during operation of the engine;
    determining at least one of an effective bulk modulus of the fuel and a pressure perturbation signature based on said pressure characteristic; and
    determining the ethanol content based on said at least one of said effective bulk modulus and said pressure perturbation signature.

2. The method of claim 1 wherein said pressure characteristic includes at least one of a group consisting of a pressure decrease resulting from an injection event and a pressure increase resulting from a pump event.

3. The method of claim 1 wherein said pressure perturbation signature includes averages corresponding to a pressure amplitude over a plurality of combustion events.

4. The method of claim 1 wherein the ethanol content is calculated based on said pressure characteristic.

5. The method of claim 1 wherein the ethanol content is determined from a look-up table based on said pressure perturbation signature.

6. The method of claim 1 wherein the ethanol content is further determined based on at least one of a volume of a fuel rail, a volume of injected fuel, a volume of pumped fuel, a bulk modulus of gasoline and a bulk modulus of ethanol.

7. The method of claim 6 wherein said volume of a fuel rail, said bulk modulus of gasoline and said bulk modulus of ethanol are provided as pre-stored constants.

8. A system for determining an ethanol content of a fuel that is part of a fuel and air mixture combusted within an internal combustion engine, comprising:
    a first module that monitors a pressure characteristic of a fuel rail during operation of the engine;
    a second module that determines at least one of an effective bulk modulus of the fuel and a pressure perturbation signature based on said pressure characteristic; and
    a third module that determines the ethanol content based on said at least one of said effective bulk modulus and said pressure perturbation signature.

9. The system of claim 8 wherein said pressure characteristic includes at least one of a group consisting of a pressure decrease resulting from an injection event and a pressure increase resulting from a pump event.

10. The system of claim 8 wherein said pressure perturbation signature includes averages corresponding to a pressure amplitude over a plurality of combustion events.

11. The system of claim 8 wherein the ethanol content is calculated based on said pressure characteristic.

12. The system of claim 8 wherein the ethanol content is determined from a look-up table based on said pressure perturbation signature.

13. The system of claim 8 wherein the ethanol content is further determined based on at least one of a volume of a fuel rail, a volume of injected fuel, a volume of pumped fuel, a bulk modulus of gasoline and a bulk modulus of ethanol.

14. The system of claim 13 wherein said volume of a fuel rail, said bulk modulus of gasoline and said bulk modulus of ethanol are provided as pre-stored constants.

15. A method of determining an ethanol content of a fuel that is part of a fuel and air mixture combusted within an internal combustion engine, comprising:
    monitoring a pressure characteristic of a fuel rail during operation of the engine;
    evaluating whether the engine is operating in a steady-state mode;
    determining at least one of an effective bulk modulus of the fuel and a pressure perturbation signature based on said pressure characteristic when the engine is operating in said steady-state mode;
    determining the ethanol content based on said at least one of said effective bulk modulus and said pressure perturbation signature; and
    regulating operation of the engine based on the ethanol content.

16. The method of claim 15 wherein said pressure characteristic includes at least one of a group consisting of a pressure decrease resulting from an injection event and a pressure increase resulting from a pump event.

17. The method of claim 15 wherein said pressure perturbation signature includes averages corresponding to a pressure amplitude over a plurality of combustion events.

18. The method of claim 15 wherein the ethanol content is calculated based on said pressure characteristic.

19. The method of claim 15 wherein the ethanol content is determined from a look-up table based on said pressure perturbation signature.

20. The method of claim 16 wherein the ethanol content is further determined based on at least one of a volume of a fuel rail, a volume of injected fuel, a volume of pumped fuel, a bulk modulus of gasoline and a bulk modulus of ethanol.

21. The method of claim 20 wherein said volume of a fuel rail, said bulk modulus of gasoline and said bulk modulus of ethanol are provided as pre-stored constants.

* * * * *